United States Patent Office 3,828,008
Patented Aug. 6, 1974

3,828,008
ELECTROCONDUCTIVE HIGH POLYMER COMPOSITION
Isao Shinohara, Eishun Tsuchida, and Katsuhiro Mizoguchi, Tokyo, Japan, assignors to Nippon Electric Company Limited, Tokyo-to, Japan
No Drawing. Filed July 20, 1972, Ser. No. 273,370
Claims priority, application Japan, July 20, 1971, 46/53,601
Int. Cl. C08f 27/04, 27/08
U.S. Cl. 260—78.4 N                 21 Claims

ABSTRACT OF THE DISCLOSURE

A high polymer composition comprising a salt constituted from an integral type of polycation polymer containing, in its principal repeating unit, a quaternized nitrogen and a heterocyclic ring, an anion radical of a tetracyano compound and a neutral tetracyano compound, in an appropriate amount such that the electroconductivity is greater than $10^{-7}$ ʊ cm.$^{-1}$ is prepared, and is found to possess excellent chemical, physical and electrical properties.

BACKGROUND OF THE INVENTION

Field Of The Invention

The present invention relates to an electroconductive high polymer composition.

More particularly, the present invention relates to an electroconductive high polymer material, in particular, a polyion complex composition prepared by forming a salt from a matrix of a polycation high polymer and a radical anion compound, which has a structure such that it is capable of imparting electroconductivity to said polymer, for example, a 7,7′,8,8′-tetracyanoquinodimethane anion radical; and adding a neutral tetracyano compound, for example, 7,7′,8,8′-tetracyanoquinodimethane (hereinafter to be abbreviated as TCNQ), to the resultant complex salt. Further, the present invention relates to a process for preparing said electroconductive high polymer complex.

Description Of Prior Art

As is well known, as a general statement, almost all high polymer materials possess insulator properties. Recent progress in the electronic industry has lead to the recognition that a need exists for an electroconductive high polymer material which possesses a degree of electroconductivity of the same order as that of inorganic semiconductor materials. The expected advantage of using high polymers for this purpose is their ease of processability. In the past, it has been recognized that certain high polymers do possess a relatively high level of electroconductivity. Among these types of polymers may be grouped the (1) ion-conductive high polymer materials, such as the high polymer electrolytes, and (2) the electron-conductive high polymer materials, such as those which possess two conjugated double bonds of π-electrons, e.g., polyacetylene or graphite. Ion-conductive high polymer materials, however, have an electroconductivity in the order of only about $10^{-8}$ mho/cm. max., which is far lower than inorganic semiconductor materials. Furthermore, electrode corrosion and the consumption of ionic groups during electrolysis usually results in such deterioration of the ion-conductive high polymer materials that their use is essentially impractical as a high reliability electronic material.

The group of electron-conductive materials (2) can further be catagorizd as (a) linear and planar π-electron conjugated high polymer compounds, such as polyene, polyine, polyphenylene, graphite, etc., (b) high polymer chelate compounds, such as poly-Cu-phthalocyanine, and (c) charge-transfer type high polymer compounds, such as polyvinyl carbazole, iodine, etc. While certain of these compounds possess a degree electro-conductivity quite comparable to the inorganic semiconductors, these compounds are more difficult to process, they are relatively insoluble in almost every solvent, and they possess no heat-softening properties. The use of these compounds is therefore restricted to those applications which permit a powdered material, such as carbon-powder. Recently, increased attention has centered around the charge-transfer type polymer complexes, which are more easily processable into film forms. Such materials, however, have no serviceable electro-conductivity in practical use. This is believed to be due to the fact that in charge-transfer type polymer complexes, the bonds between the donor molecules and the acceptor molecules depend only upon the charge-transfer type complex bonds. This means that the barriers to the flow of electrons are high, making it difficult to obtain a high level of electroconductivity.

In contrast to such materials, the complex formed from a polycation polymer and 7,7′,8,8′-tetracyanoquinodimethane radical, as described in the Japanese Patent Publication Gazette No. 15870/1969 which corresponds to U.S. Pat. No. 3,346,444, has been recognized to possess such favorable properties as ease of processability and high electroconductivity. It is generally not serviceable in practical use, however, owing to a low measurement reproducibility and generally poor stability.

SUMMARY OF THE INVENTION

Accordingly, it is one object of the present invention to provide an electroconductive high polymer composition which avoids the above described difficulties and which possesses excellent chemical, physical and electrical properties.

It is another object of this invention to provide an economically advantageous process for preparing such useful electroconductive high polymer compositions.

These and other objects, as will hereinafter become more readily apparent, have been attained by the provision of an electroconductive high polymer composition which is formed from an integral type polycation polymer salt containing, in its principal repeating unit, a quaternarized nitrogen as the cation portion of the salt, and as the anion portion, an anion radical of a tetracyano compound, or a sufficient amount of a tetracyano compound to impart a degree of electronductivity to said salt of more than $10^{-7}$ ʊ cm.$^{-1}$. These types of complex salts are prepared by reacting an integral type polycation polymer containing repeating units which contain a saturated heterocyclic ring having a quaternarized nitrogen in the ring with a metallic salt, or an organic cation salt of a tetracyano anion radical, in a liquid phase, in a nitrogen atmosphere. A neutral tetracyano compound is added to a solution of the complex. The electroconductive high polymer compositions of the present invention achieved by structural considerations concerning π-electron conduction, display an extremely excellent effect.

DETAILED DESCRIPTION OF THE PREFERRED EMBODIMENTS

By considering the mechanism of electroconduction due to non-localized π-electrons, it has been possible to divide the structure of the complex, functionally, into a matrix portion and a portion in which conduction electrons are active. That is, in the composition of the present invention, the cation polymer portion can be considered to be a matrix of a complex which functions to maintain a conjugated system, but which also determines the degree of heat resistance and processibility of the system.

In molecular design trials on the structure of macromolecular polyion complexes, it has been found that the reaction of a low molecular weight radical anion with a polycation polymer will result in the formation of a complex of salt type bonds. That portion of the structure which contributes to electroconduction is designated as TCNQ in a combination with the polycation high polymer and a TCNQ radical anion. Doping is considered to be necessary in order to completely establish a conjugated system in the complex. The particular structure and arrangement of the conjugated system has extreme importance so far as electroconductivity is concerned. In fact, various polycations having pendant type structures or integral type structures possess widely varying properties. If the compound has almost no regular space arrangement, it will possess almost no electroconductivity. It has now been found that an integral type polycation polymer which possesses a quaternized nitrogen in its principal repeating unit is effective, and in particular, a polycation high molecular weight polymer which contains a quaternarized nitrogen in a saturated heterocyclic ring diamine such as shown by general formulae (1) or (2) are most effective:

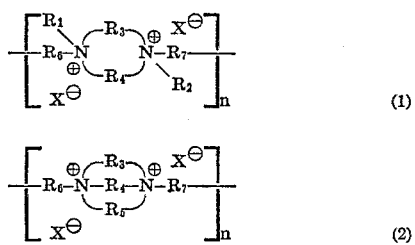

(1)

(2)

wherein $R_1$ and $R_2$ each may be the same or different and each may represent alkyl groups containing 1-4 carbon atoms, $R_3$, $R_4$ and $R_5$ which may be the same or different and each may represent alkylene groups containing 1-5 carbon atoms, $R_6$ and $R_7$ may be the same or different and each represent an unsaturated alkylene, allyl alkylene or xylylene groups, $X^\ominus$ is a counter ion to the ammonium group.

For comparison purposes, reference is made to a polycation polymer described in Japanese Patent Publication Gazette No. 15879/1969 which corresponds to U.S. Pat. No. 3,346,444. The polycation polymer described in that publication has either a pyridine group or a phenyl group pendant on a repeating methylene chain. The nitrogen atoms are quaternarized. The complexes described in that publication have an electroconductivity of $10^{-3}$ mho/cm. max. and reproduceability is quite poor. Also, heat stability is low, and the products are readily deterioratable. In contrast, the polycation polymers of the present invention differ both in preparation and in composition, and the products possess far superior chemical, physical and electrical properties. The polycation polymers of the present invention are of an integral (or laminate) type having a quaternarized nitrogen cation group in the principal high molecular weight chain. Whereas the pendant type polymers of the above indicated prior art, are prepared by polymerizing vinyl type monomers and carrying out the quaternization reaction of resulting polymer with the aid of quaternizing agents, or by synthesizing a quaternized monomer by an extremely difficult process and then polymerizing the monomer, the integral type of polycation polymer of the present invention is advantageously and very economically prepared by quaternization of the nitrogen atoms and simultaneously carrying out a polyaddition in a one step process.

In other words, the integral type polycation complexes differ from the pendant type TCNQ salts in that they have a polycation polymer matrix which possesses a quaternized nitrogen cation group in its principal high polymer chain. This permits the anion radical, such as a TCNQ anion radical, to contribute to the electroconductivity by being systematically and closely arranged by chemical bonds. This makes it easy to introduce a tetracyano compound, such as a neutral TCNQ, spatially, so that the integral type of polycation complex will display such excellent characteristics as an electroconductivity which is comparatively better by an order of about 3 to 4, a thermal variation in electroconductivity which is smaller by a factor of about 3 and a heat resistance which is higher by a factor of about 1.5. The pendant type TCNQ salts, on the other hand, are irregularly bonded and so are poorer in electroconductive properties, heat sensitivity and heat resistance.

The composition of the present invention possesses good solubility in various solvents. For instance, it has at least a 20% by weight solubility in solvents, as dimethyl formamide, dimethyl acetoamide, dimethyl sulfoxide, or the like. The composition of the present invention possesses excellent flexibility, and films prepared by vaporizing the solvent from a dimethyl formamide solution thereof are extremely stable within the temperature range of $-30°$ C. to $250°$ C. They are mechanically strong and paramountly easy to process and thus have a far wider range of potential application. The material of the present invention is very low in hygroscopicity owing to its rigid bond structure between the polycation polymer and the anion radical, and it suffers almost no change in electrical characteristics even after being allowed to stand for 2,000 hours in a humidity of 67%. The integral type of polycation polymer, and particularly those which contain a quarternarized nitrogen in a saturated heterocyclic diamine ring in its principal chain, do not show high electroconductivity, even when it contains a radical salt with tetracyano radicals, such as TCNQ anion radicals. If a neutral TCNQ is introduced thereinto, however, the resulting composition will possess extremely high electroconductivity; in fact, as high as $10^{-1}$ ʊcm.$^{-1}$. This represents an increase in the order of about 8. While it is not completely understood, this increase seems to originate from the fact that when the quaternized nitrogen is in the saturated heterocyclic diamine ring, the ring structures in the polymer molecules will overlap each other, enhancing molecular crystallinity and making more regular the arrangement of the polymer-TCNQ complexes. The TCNQ which is responsible for electroconduction does not suffer great spatial barriers owing to the quaternized nitrogens and hence the structure and arrangement of regular $\pi$-electron conjugated system is maintained. As stated above, the electroconductive high polymeric materials of the present invention possess excellent thermal, chemical and electrical stability owing to the regular and strong configuration of TCNQ to polycation polymer. In other words, the material of the present invention is sufficiently stable up to at least $200°$ C. without showing evidence of oxidation deterioration. The material is essentially invariable in electrical characterstics even when allowed to stand in a thermo-hygrostat at a temperature of $80°$ C. and a humidity of 67% for up to 2,000 hours. The material is therefore to be considered highly reliable and may be efficiently employed for use in electric and electronic circuit components that demand high stability and high reliability.

Furthermore, the electroconductive high polymeric materials of the present invention have a very high solvent solubility and high film feasibility. For example, a film prepared from an N,N'-dimethyl formamide solution will be glossy and possess excellent adhesivity. It will not evidence crack formation or pinholes. Accordingly, this material can be used in a very wide range of applications due to its paramount processing feasibility.

The most stable and easily available tetracyano anion radical which may be used as the anion portion of the materials of the present invention, include 7,7',8,8'-tetracyanoquinodimethane anion radical or other anion radicals of tetracyano compounds which possess great electron-affinity, such as tetracyano-ethylene anion radical, 1,2,4,5-tetracyanoquinone anion radical, 1,2,4,5-tetracyano-thio-quinone anion radical, etc. These anion radicals may conveniently be introduced in the form of a metallic salt, such as lithium, sodium, potassium, copper, iron, or cesium salt, etc., or as an organic cation salt with various amines, ammonium, etc. In general, anion radical salts of tetracyano compounds are easily soluble in such common solvents as alcohols, water, etc. The most stable, most readily available and easiest of such salts which may be used is the lithium salt of TCNQ.

It has here been shown that a simple salt comprising a cation portion consisting of a polycation polymer having quarternarized nitrogen cation groups within a saturated ring amine in the principal high polymer chain as a cation as shown in the general formula (1) and (2), and an anion portion consisting of a radical of a tetracyano compound, has semiconductive properties. Such simple salts, however, do not possess sufficient electroconductivity. The addition of a neutral tetracyano compound thereto will enable one to achieve a rise in electroconductivity of up to $10^{-7}$ ʊ cm.$^{-1}$ or more. Consequently, the materials of the present invention comprise a complex salt containing a simple salt and a neutral tetracyano compound added thereto.

Suitable neutral tetracyano compounds which may be used are the same as those used for producing the tetracyano anion radical.

The method of preparing the composition of the present invention will now be described referring, for convenience, to the use of a lithium-TCNQ salt, as an example of a tetracyano anion radical salt. The present invention, however, should not be construed as being limited to lithium-TCNQ salt only.

The polycation polymer is easily soluble in solvents such as alcohols, for example, methanol, ethanol, and water. A suitable amount of the polycation polymer can therefore be completely dissolved in any one of the above mentioned solvents or in a mixture of solvents and then added to an alcohol solution of lithium-TCNQ salt with vigorous stirring in an inert atmosphere. The resulting polycation polymer-TCNQ simple salt will separate as a green or black precipitate, while a lithium halogenide produced remains dissolved in the system. Separation of the salt is thus easy. The reaction temperature and reaction time may be varied depending upon the type and concentration of material used. It has been found that most favorable results are obtained at a reaction temperature within the range of 0° to 50° C. and a reaction time of 30 minutes to 5 hours.

As is well known, an anion radical of a tetracyano compound will react easily with an oxygen molecule and be oxidized. Therefore, in the present synthesis, in order to avoid the loss of reactant due to side reactions, the solvents used should be degassed in an inert atmosphere before use, and all reactions should be carried out in an inert atmosphere. When lithium TCNQ salt is used in an amount in excess of 1 to 2 times stoichiometric amount, the exchange reaction rate of TCNQ and the exchange rate of the counter ions will be increased and a yield of more than 90% can be obtained in most cases.

As a result of chemical analysis of the product so obtained, it has been confirmed that the desired product is obtained and the quaternized nitrogen cation groups have been found to be substituted with TCNQ anion radicals. Although the polycation polymer-TCNQ simple salt thus obtained shows no sufficient electroconductivity in itself, it has been found that, when a sufficient amount of neutral TCNQ (15–30% of anion TCNQ) is added thereto, to produce a π-electron conductive polycation polymer-TCNQ complex salt, an extremely high electroconductivity, e.g., above $10^{-4}$ mho/cm. is produced.

The addition of neutral TCNQ may be carried out by simple mixing or in solution. The particular method of mixing, however, does not usually lead to the formation of a complete complex of both materials, and instead a product of inferior reproducibility of measurement is provided. On the other hand, formation in solution provides a product having good, stable measurement reproducibility. The polyion complexes of the present invention display excellent solvent solubility; for example, a solubility of at least 30%, by weight, in a solvent such as N,N'-dimethyl formamide, N,N'-dimethyl acetoamide, N,N'-dimethyl sulfoxide, N-methyl-2-pyrrolidone, etc.

In preparing films, one of these solvents may be used to completely dissolve the polycation polymer-TCNQ simple salt and an appropriate amount of neutral TCNQ. The resulting solution is then poured over a base plate, such as a plastic or glass plate, and the solvent is evaporated under a sufficiently reduced pressure.

As a result of various measurements using films formed in that manner, it has been found that they possess a high electroconductivity of $10^{-4}$ mho/cm. or more, the frequency characteristics of electroconductivity is completely stable up to at least seevral mHz., and the thermal variation in electroconductivity is very small and stable.

The polycation polymer-TCNQ complex salt containing neutral TCNQ may be used as is, or may be used as a blend, or as a combination with any other highly resistive polymer, if necessary.

Having now generally described the invention, a further understanding can be attained by reference to the following Examples which are provided herein for purposes of illustration only and are not intended to be limiting in any manner unless otherwise herein specified.

EXAMPLE 1

6.9 g. (0.024 mole) of polycation polymer produced by nitrogen quarternarization reaction of N,N-dimethyl piperazine and p-xylylene dichloride was completely dissolved in 1.5 l. of a mixed solvent of distilled water and methanol in a ratio of 1:2. The mixture was added dropwise to 12.4 g. (0.059 mole) of lithium TCNQ salt which was completely dissolved in 1.5 l. of mixed solvent of distilled water and methanol in the same ratio. The reaction was run under vigorous stirring in an atmosphere of nitrogen at 30° C. for 3 hours. The methanol-water solvent used was previously boiled under reflux at its boiling point for 5 hours to effect degassing. About 30 minutes after mixing of the reactants, a dark blue precipitate appeared. After the reaction was complete, the precipitate was separated by filtration and, after sufficient washing with distilled water and methanol, it was sufficiently dried. A reaction product was obtained in a yield of 13.8 g.

By chemical analysis including ultimate analysis, halogen analysis, ESR analysis, etc., it was confirmed that the counter ion was almost completely substituted with a TCNQ anion radical and the desired product was obtained.

Next, 200 mg. of polycation polymer-TCNQ simple salt were completely dissolved in 1 ml. of N,N'-dimethylformamide and a solution of N,N'-dimethylformamide having dissolved therein an appropriate amount of neutral TCNQ was added thereto. When the resulting solution was passed over a glass plate and the solvents sufficiently vaporized under reduced pressure, a glossy film of improved adhesion was obtained. The specific resistivity of the film so obtained was measured and the relationship to the amount of neutral TCNQ added is shown in Table I.

TABLE I

| Amount of neutral TCNQ added, wt. percent: | Specific resistivity, Ω cm. |
| --- | --- |
| 0 | $1.75 \times 10^8$ |
| 5 | $1.65 \times 10^4$ |
| 10 | $1.10 \times 10^3$ |
| 15 | $4.21 \times 10^1$ |
| 20 | $2.2 \times 10^1$ |
| 25 | $1.4 \times 10^2$ |
| 30 | $1.7 \times 10^3$ |

The film showed the lowest resistance value when the amount of neutral TCNQ added was 20%, by weight. The thermal variation of resistance value was small and the activating energy of electric conductivity was 0.11 ev. within the temperature range of —25° to 150° C. By thermal analysis, it was confirmed that this material was stable up to at least 200° C. Also, the change due to heat and humidity as measured against process time was very little and even after being allowed to stand in a thermohygrostat of 80° C. and 67% for at least 2,000 hours, the film remained unchanged in electrical and chemical properties and was found to have excellent reliability. Also, the material was found to possess very good frequency characteristics of resistance values so that the frequency characteristic was unchanged up to the frequency of several mHz.

EXAMPLE 2

3.03 g. (0.010 mole) of polycation polymer produced by nitrogen quaternization reaction of N,N-dimethyl piperazine and ethylene dibromide was completely dissolved in 0.5 l. of water and was reacted with 5.3 g. (0.025 mole) of lithium TCNQ salt dissolved in 0.5 l. of water under vigorous stirring in an atmosphere of nitrogen at 40° C. for 5 hours. Following the reaction, the product was allowed to stand at room temperature for 3 hours.

The precipitate was separated by filtration and, after washing with water and methanol, was sufficiently dried. The yield of product thus obtained was 5.0 g. By chemical analyses on the reaction product, it has been found that a counter ion was almost completely substituted with a TCNQ anion radical and the desired product was obtained.

A film was made from the product in the same manner as in Example 1 and was electrically measured. The result is shown in Table II.

TABLE II

| Amount of neutral TCNQ added, wt. percent: | Specific resistivity, $\Omega$ cm. |
|---|---|
| 0 | $4.3 \times 10^7$ |
| 5 | $7.1 \times 10^6$ |
| 10 | $2.0 \times 10^6$ |
| 15 | $4.8 \times 10^5$ |
| 20 | $2.7 \times 10^5$ |
| 25 | $6.3 \times 10^5$ |

The film showed the lowest resistance value when the amount of neutral TCNQ added was 20%, by weight, and, as a result of thermal analysis, was found to be quite stable, showing good heat resistance up to 230° C. The changes due to heat and humidity as a fraction of process time was small and even after being allowed to stand in a thermohydrostat of 80° C. and 80% for at least 2,000 hours, the film remained unchanged in electrical and chemical properties and was found to have very excellent reliability.

EXAMPLE 3

5.4 g. (0.188 mole) of polycation polymer produced by nitrogen quaternarization reaction of triethylene diamine and p-xylyene dichloride was dissolved in a mixed solvent of water and methanol consisting of 250 cc. of water and 250 cc. of methanol and was reacted with 9.9 g. (0.470 mole) of lithium TCNQ completely dissolved in 500 cc. of water-methanol mixed solvent in the same ratio under vigorous stirring in an atmosphere of nitrogen at 30° C. for 3 hours. Immediately after the reaction, a dark blue precipitate appeared. After the reaction was complete, the precipitate was separated by filtration, sufficiently washed with distilled water and methanol, and sufficiently dried. Thus, 7.4 g. of polycation TCNQ simple salt was obtained. By chemical analysis on the reaction product, it was found that a halogen ion was almost completely substituted with a TCNQ anion radical and the desired product was obtained. Next, the relationship between the electric conductivity of the film made by the same method as in Example 1 and neutral TCNQ added was shown in Table III.

TABLE III

| Amount of neutral TCNQ added, wt. percent: | Specific resistivity, $\Omega$ cm. |
|---|---|
| 0 | $2.3 \times 10^7$ |
| 10 | $6.2 \times 10^4$ |
| 20 | $5.5 \times 10^3$ |
| 25 | $2.3 \times 10^3$ |
| 30 | $3.4 \times 10^4$ |

The film showed the lowest resistance value as $2.3 \times 10^3 \Omega$ cm.

when the amount of neutral TCNQ added was 25%, by weight. Even after being allowed to stand in a thermo-hygrostat of 80° C. and 67%, the material was found to be excellent in stability, so that no electrical or chemical change was observed.

EXAMPLE 4

3.6 g. (0.110 mole) of polycation polymer produced by nitrogen quaternization of triethylene diamine and dibromobutane was dissolved in 300 cc. of methanol and was reacted with 5.7 g. (0.270 mole) of potassium salt of tetracyano ethylene anion radical (hereinafter being abbreviated as "potassium TCNE") completely dissolved in 200 cc. of methanol. The reaction was run at a reaction temperature of 25° C. in an atmosphere of nitrogen for 4 hours. The methanol solvent used was previously dehydrated and purified and thereafter was sufficiently degassed by nitrogen gas substitution. 6.3 g. of reaction product was obtained.

The product was made into a film. The electric conductivity of the film was measured. The relationship between the electric conductivity and the amount of neutral TCNE added is shown in Table IV.

TABLE IV

| Amount of neutral TCNE added, wt. percent: | Specific resistivity, $\Omega$ cm. |
|---|---|
| 0 | $5.8 \times 10^6$ |
| 10 | $2.1 \times 10^4$ |
| 15 | $4.8 \times 10^3$ |
| 20 | $9.7 \times 10^3$ |
| 30 | $7.8 \times 10^4$ |

Although in Examples 1, 2 and 3, the methylene chain was described by specific example, in general, any methylene chain having 2 to 18 carbon atoms will show the same effect. Also, when the number of carbon atoms is greater than 18, the distance between neighboring anion portions expands and the barrier of carrier grows higher so that the electrical conductivity decreases.

The polyion complex of the present invention can be used in numerous uses. For example, the present polyion complex can be dissolved in an appropriate solvent to be coated on a part of an electronic instrument, such as a print base plate of an electronic circuit, an electronic part of a semi-conductor element, etc., for use instead of a metal or solder and, in addition, is widely applicable for uses such as coating agents for exothermic bodies, photoelectric bodies, or for forming an electrical conductive film.

Having now fully described the invention, it will be apparent to one of ordinary skill in the art that many changes and modifications can be made thereto without departing from the sprit or scope of the invention as set forth herein.

Accordingly,

What is claimed and intended to be secured by Letters Patent is:

1. An electroconductive high polymer composition which comprises a salt of an integral type of polycation polymer containing in its principal repeating unit chain, at least one quaternized nitrogen in a saturated heterocyclic ring as the cation portion of said salt, and, an anion radical of a tetracyano compound, as the anion portion of said salt, and a neutral tetracyano compound in an amount sufficient to impart an electroconductivity of more than $10^{-7}$ ℧ cm.$^1$ to said salt.

2. The electroconductive high polymer composition as set forth in Claim 1, wherein said polycation polymer has the structure:

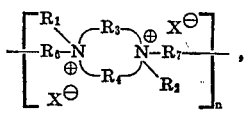

wherein $R_1$ and $R_2$ may be the same or different and each represents an alkyl group containing 1 to 4 carbon atoms; $R_3$ and $R_4$ may be the same or different and each represents an alkylene group containing 1 to 5 carbon atoms; $R_6$ and $R_7$ may be the same or different and each represents a member selected from the group consisting of unsaturated alkylene, allyl alkylene and xylylene group; $X^\ominus$ is a counter ion to the ammonium group.

3. The electroconductive high polymer composition as set forth in Claim 1, wherein said polycation polymer has the structure:

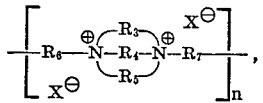

wherein $R_3$ and $R_4$ may be the same or different and each represents an alkylene group containing 1 to 5 carbon atoms; $R_6$ and $R_7$ may be the same or different and each represents a member selected from the group consisting of unsaturated alkylene, allyl alkylene and xylylene group; $X^\ominus$ is a counter ion to the ammonium group.

4. The electroconductive high polymer composition as set forth in Claim 1, wherein said anion radical is 7,7′, 8,8′-tetracyanoquinodimethane anion radical.

5. A process for preparing an electroconductive high polymer composition which comprises reacting an integral type polycation polymer containing, in its principal repeating unit chain, at least one quaternized nitrogen in a saturated heterocyclic ring, and a metallic salt or organic cation salt of tetracyano anion radical in a liquid phase in an inert atmosphere to prepare a salt of a polycation polymer and a tetracyano anion radical and thereafter adding a neutral tetracyano compound to a solution of said salt.

6. The process as set forth in Claim 5, wherein said polycation polymer has the structure:

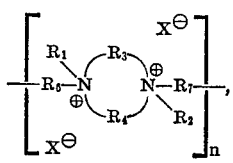

wherein $R_1$ and $R_2$ may be the same or different and each represents an alkyl group containing 1 to 4 carbon atoms; $R_3$ and $R_4$ may be the same or different and each represents an alkylene group containing 1 to 5 carbon atoms; $R_6$ and $R_7$ may be the same or different and each represents a member selected from the group consisting of unsaturated alkylene, allyl alkylene and xylylone group; $X^\ominus$ is a counter ion to the ammonium group.

7. The process as set forth in Claim 5, wherein said polycation polymer has the structure:

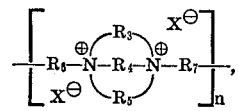

wherein $R_3$, $R_4$ and $R_5$ may be the same or different and each represents an alkylene group containing 1 to 5 carbon atoms; $R_6$ and $R_7$ may be the same or different and each is a member selected from the group consisting of unsaturated alkylene, allyl alkylene and xylylene groups; $X^\ominus$ is a counter ion to the ammonium group.

8. The process as set forth in Claim 5, wherein said tetracyano anion radical is 7,7′, 8,8′ - tetracyanoquinodimethane anion radical.

9. The process as set forth in Claim 5, wherein said tetracyano anion radical is tetracyano ethylene anion radical.

10. The process as set forth in Claim 5, wherein said metallic salt of tetracyano anion radical is lithium-TCNQ.

11. The process as set forth in Claim 5, wherein said metallic salt of tetracyano anion radical is potassium-TCNE.

12. The process as set forth in Claim 5, wherein the amount of neutral tetracyano compound added is 5 to 30%, by weight.

13. The process as set forth in Claim 5, wherein lithium-TCNQ is used in an amount in excess of stoichiometric amount by a factor in the range between 1.0 and 1.2, the reaction temperature is 0° to 50° C., and the reaction time is 30 minutes to 5 hours.

14. The electroconductive high polymer composition as set forth in Claim 1, wherein said anion radical is selected from the group consisting of 7,7′, 8,8′-tetracyanoquinodimethane anion radical, tetracyano-ethylene anion radical, 1,2,4,5-tetracyanoquinone anion radical, and 1,2, 4,5-tetracyano-thio-quinone anion radical.

15. The electroconductive high polymer composition as set forth in Claim 1, wherein the neutral tetracyano compound as an anion portion selected from the group consisting of 7,7′, 8,8′ - tetracyanoquinodimethane anion radical, 1,2,4,5-tetracyanoquinone anion radical and 1,2, 4,5-tetracyano-thio-quinone anion radical and a cation selected from the group consisting of lithium sodium, potassium, copper, iron, and cesium.

16. The electroconductive high polymer composition as set forth in Claim 1, wherein the amount of said neutral tetracyano compound is from 15 to 30% of the anion radical of a tetracyano compound.

17. The electroconductive high polymer composition as set forth in Claim 1, wherein the integral type poly cation polymer is the quaternization reaction product of N,N-dimethyl piperazine and p-xylylene dichloride, the anion radical is TCNQ and the neutral tetracyano compound is a lithium TCNQ salt.

18. The process as set forth in Claim 5, wherein the tetracyano anion radical is selected from the group consisting of 7,7′, 8,8′-tetracyanoquinodimethane anion radical, tetracyano-ethylene anion radical, 1,2,3,5-tetracyanoquinone anion radical and 1,2,3,5 - tetracyano-thio-quinone anion radical.

19. The process as set forth in Claim 5, wherein the reaction takes place in the presence of a solvent selected from the group consisting of methanol, ethanol, water, and mixtures thereof.

20. The process as set forth in Claim 5, wherein said polycation polymer is produced in a one-step quaternization and poly addition process by reacting a diamine with an organic dihalide.

21. The process as set forth in Claim 20, wherein the diamine is N,N-dimethyl piperazine and the organic dichloride is p-xylylene dichloride.

References Cited

UNITED STATES PATENTS

| | | | |
|---|---|---|---|
| 3,346,444 | 10/1967 | Lupinski et al. | 161—213 |
| 3,632,526 | 1/1972 | Yamamoto et al. | 252—500 |
| 3,448,177 | 6/1969 | Goodings et al. | 260—895 |

JOSEPH L. SCHOFER, Primary Examiner

J. KIGHT, Assistant Examiner

U.S. Cl. X.R.

161—213; 252—500; 260—29.2 N, 32.6 N, 33.4 R, 78.4 R, 895

UNITED STATES PATENT OFFICE
CERTIFICATE OF CORRECTION

Patent No. 3,828,008          Dated August 6, 1974

Inventor(s)   Isao Shinohara et al.

It is certified that error appears in the above-identified patent and that said Letters Patent are hereby corrected as shown below:

The term of this patent subsequent to

Sept. 10, 1991, has been disclaimed.

Signed and sealed this 1st day of April 1975.

(SEAL)
Attest:

RUTH C. MASON
Attesting Officer

C. MARSHALL DANN
Commissioner of Patents
and Trademarks